(12) United States Patent
Lee (10) Patent No.: US 7,782,359 B2
(45) Date of Patent: Aug. 24, 2010

(54) IMAGE CAPTURE APPARATUS AND METHOD

(75) Inventor: Shinhaeng Lee, San Diego, CA (US)

(73) Assignee: Olympus Corporation, Hachioji-Shi, Tokyo (JP)

( * ) Notice: Subject to any disclaimer, the term of this patent is extended or adjusted under 35 U.S.C. 154(b) by 1337 days.

(21) Appl. No.: 11/258,999

(22) Filed: Oct. 26, 2005

(65) Prior Publication Data

US 2007/0091172 A1    Apr. 26, 2007

(51) Int. Cl.
*G06K 9/00* (2006.01)
*H04N 5/253* (2006.01)

(52) U.S. Cl. .................... 348/113; 382/100
(58) Field of Classification Search .......... 348/113, 348/222.1, 226.1, 207.2, 723, 837, 441, 370; 340/988, 439, 540; 455/404.1, 456.3, 414.1; 715/741, 730, 781, 764; 382/100, 182, 312, 382/313, 305; 358/1.15
See application file for complete search history.

(56) References Cited

U.S. PATENT DOCUMENTS

| 2003/0009281 A1 | 1/2003 | Whitham |
| 2003/0125872 A1 | 7/2003 | Kauvo et al. |
| 2005/0075116 A1 | 4/2005 | Laird et al. |
| 2008/0246850 A1 * | 10/2008 | Marlowe ............. 348/222.1 |

FOREIGN PATENT DOCUMENTS

JP    2004117094    4/2004

* cited by examiner

*Primary Examiner*—Saeid Ebrahimi Dehkordy
(74) *Attorney, Agent, or Firm*—Sheppard Mullin Richter & Hampton LLP (57) ABSTRACT

A digital camera with navigation features comprises optical elements configured to focus an image onto a focal plane, an image capture medium positioned at the focal plane configured to capture the image focused onto the focal plane, image control logic configured to process images captured by the image capture medium, navigation control logic configured to perform navigation functions and to determine navigational information, and a display screen communicatively coupled to the image control logic and the navigation control logic and configured to display at least one of an image captured by, the image capture medium and a map for navigation purposes. The digital camera can further comprise a docking station configured to be communicatively coupled to the digital camera and having an information storage device for storage of images, navigation information and other data.

4 Claims, 4 Drawing Sheets

IMAGE CAPTURE APPARATUS AND METHOD

FIELD OF THE INVENTION

The present invention relates generally to image capture devices, and more particularly to a system and method for flexible operation of an image capture device.

BACKGROUND OF THE INVENTION

With advances in electronics, consumers have available to them a multitude of devices that were previously unavailable. Take, for instance, electronic navigation systems. Navigation generally refers to the art of determining a route on which to travel from one place to another, preferably as quickly and efficiently as possible. In around 3500 B.C., shipping vessels. navigated by remaining close to shore and relied on visual identification of landmarks or characteristics of the land they could observe visually. Therefore, these early sailors traveled by day and hesitated to venture beyond the sight of land. Some civilizations lit fires on land to aid in the navigation of vessels from point to point.

When early sailors did venture out of sight of land, the navigator determined a latitude position by observing the height of the sun during the day and the North Star at night. Additionally, some mariners plotted their course using major constellations, though this was not an exact science. Vessels followed the east/west movement of the sun or the track of the stars. However, the navigator had no way to accurately determine longitude and therefore, once out of sight of land, had no idea how far east or west he was. Estimates of position then were made based on the elapsed time of travel and direction of travel. Likewise, early land travelers often traveled great distances, navigating their way to remote locations and then back home based on the sun and other stars.

One of the earliest man-made navigation instruments is the compass. With early compasses, a navigator would rub an iron needle against a lodestone to magnetize the needle, place the needle on a piece of straw so that it would float, and place the straw in a vessel containing water. The magnetic charge on the needle would cause the straw to point in a north-south direction. Of course, this crude apparatus was inconsistent and susceptible to error. Also, like many of today's simple compasses, these early compasses would have pointed to magnetic north, which is several degrees off of the true North Pole.

One other invention used by early mariners was the lead line. Developed in the 13th Century, the lead line was used to measure the depth of water and the condition of the sea floor. The line was weighted and marked with a scale so as to be used to determine water depth. The weight at the bottom was also used to capture samples of the bottom. Thus, a method of navigation was to travel from one depth to another, and to make course determinations based on reaching certain depths and bottom conditions.

Early mariners also relied on the cross-staff aswell as the astrolabe to determine latitude by measure the angle of the sun and stars above the horizon. These are considered forerunners of the more accurate sextant, which was used well into the 20th century.

As mentioned above, early land based navigation also relied on celestial navigation techniques. However, land is infinitely more amenable to the marking of trains and roads and to the posting of signs. Thus, land and sea navigation techniques tended to diverge dramatically. While mariners moved toward radar and loran assisted navigation in the 20th. century, land travelers began to rely more heavily on following posted routes and navigating with maps and signs. However, both land and sea travelers faced shortcomings with their techniques until the Global Positioning System (GPS) was implemented commercially. The GPS is a worldwide, satellite-based navigation system that utilizes a constellation of 24 low-earth orbiting satellites (sometimes referred to by the acronym LEOS) on which an earth station can get a position fix.

More particularly, earth stations triangulate their positions based on timing signals received from a plurality of GPS satellites. A GPS receiver receives the timing signals from multiple satellites and, based on information such as satellite position and time of flight, uses this data to calculate a position of the receiver on the ground (or in the air).

The speed and accuracy of commercial GPS systems has led to a very high demand in many consumer markets. Although still an expensive option, GPS navigation systems are finding their way into boats, automobiles, golf carts and other vehicles in ever increasing numbers.

BRIEF SUMMARY OF THE INVENTION

According to one embodiment of the invention, a digital camera, digital video recorder or other image capture device is provided with the functionality to display navigation information and in one embodiment to perform navigation functions. In one embodiment, navigation functions include route determination, real-time position tracking, near real-time position tracking, estimated time of arrival calculations and point of interest location.

In one embodiment, a digital camera with navigation features is provided. The digital camera comprises optical elements configured to focus an image onto a focal plane, an image capture medium positioned at the focal plane configured to capture the image focused onto the focal plane, image control logic configured to process images captured by the image capture medium, navigation control logic configured to perform navigation functions, and to determine navigational information, and a display screen communicatively, coupled to the image control logic and the navigation control, logic and configured to display at least one of an image captured by the image capture medium and a map for navigation purposes. The digital camera can further comprise a docking station configured to be communicatively coupled to the digital camera and having an information storage device for storage of images, navigation information and other data.

In one embodiment, at least a portion of the navigation control logic is located in the docking station and communicatively, coupled to the digital camera, while in another embodiment, the navigation control logic is located in the digital camera. The system can be further provided with control logic configured to detect an undocking event and to transfer navigational information from the docking station to the image capture device in advance of the undocking event.

In yet another embodiment, a combined image capture device and navigation system, comprises image control logic configured to process images captured by the image capture device, navigation control logic configured to perform navigation functions and to determine navigational information, and a screen configured to display at least one of a captured image, a map and navigational information. The image capture device can further include an information storage device coupled to at least one of the image control logic and the navigation control logic, and configured to store at least one of a captured image, a map and navigational information. Additionally, the image capture device can further include a docking station communicatively coupled to the image capture device and comprising an information storage device, wherein the navigation control logic is located in the docking station, the image capture device or a combination of the two. The system can also include control logic configured to detect an undocking event and to transfer navigational information from the docking station to the image capture device in advance of the undocking event. The image capture device can be at least one of a digital camera and a video camera.

In the various embodiments, the control logic comprises at least one of hardware, software and a combination of hardware and software.

In yet another embodiment, a combined image capture device and navigation system, comprises means for processing images captured by the image capture device, means for performing navigation functions and determining navigational information, and means for displaying at least one of a captured image, a map and navigational information. The system can further comprise a docking means communicatively coupled to the image capture device and comprising memory means. In one embodiment, the means for performing navigation functions is located in the docking means, the image capture device, or distributed among both the docking means and the image capture device. The system can also include means for detecting an undocking event and to transfer navigational information from the docking means to the image capture device in advance of the undocking event.

In still another embodiment, a method of using an image capture device to perform navigation functions comprises the steps of downloading navigational information to an image capture device capable of capturing and recording digital images displaying navigational information on a display screen of the image capture device, and accepting user input to provide interactive display of the navigational information. In one embodiment, the navigational information is downloaded, from a docking station communicatively coupled to the image capture device. In another embodiment, step of performing by the image capture device or a docking station navigation functions is included, wherein the navigation functions comprise at least one of route determination, real-time position tracking, near real-time position tracking, estimated time of arrival calculations and point of interest location.

In still another embodiment a system for performing navigation functions comprises control logic configured to download navigational information to an image capture device capable of capturing and recording digital images a display screen configured to display navigational information on the image capture device, and control logic configured to provide interactive display of the navigational information. The navigational information can be downloaded from a docking station communicatively coupled to the image capture device. The navigation functions can be performed by the image capture device, a docking station, or a combination thereof. The navigation functions can include route determination, real-time position tracking, near real-time position tracking, estimated time of arrival calculations and point of interest location.

Further features and advantages of the present invention, as well as the structure and operation of various embodiments of the present invention, are described in detail below with reference to the accompanying drawings.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration, these drawings are not necessarily made to scale.

DETAILED DESCRIPTION OF THE INVENTION

The present invention is directed toward an apparatus and method for providing an image capture device such as, for example, a digital camera, in combination with a transportable navigation system. In accordance with one embodiment of the invention, a digital camera is provided with functionality to enable it to not only capture and store digital images, but also to provide a display of one or more maps and other enhanced navigational features. In one embodiment, the image capture device is configured so as to be removably connected to a docking station. Connection to a docking station can enhance the usability of the device, allowing the navigational features to be utilized while the image capture device is docked in environments such as, for example, a car, truck, boat, airplane, or other vehicle.

In accordance with one embodiment of the invention, the navigation system can be integrated with any of a number of image capture devices. However, in one embodiment, the navigation system is integrated with a digital camera as the image capture device. Likewise, the navigation system can be implemented utilizing any of a number of different navigational techniques, but in one embodiment, is implemented using a GPS navigation system.

Figure 1:
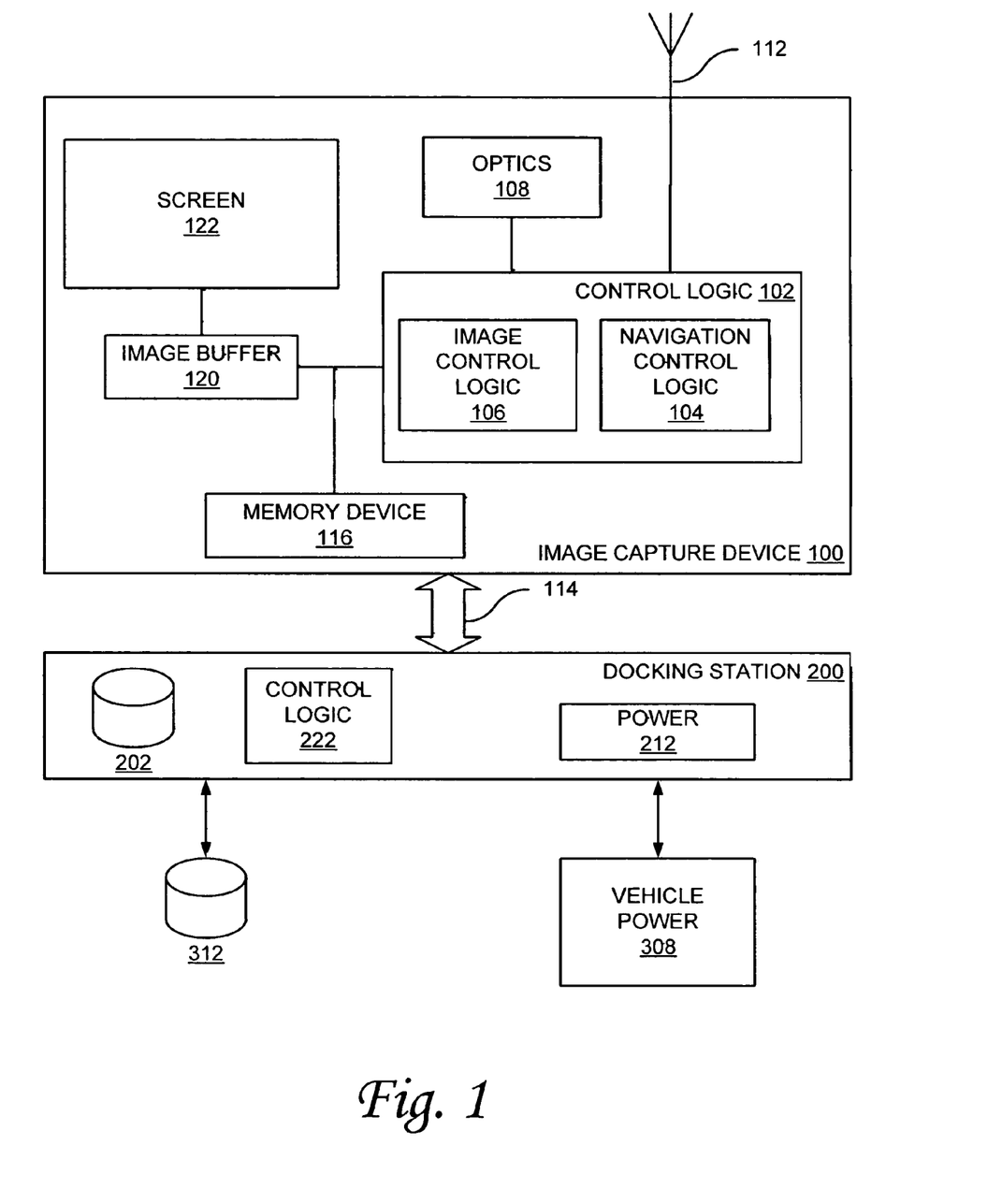
FIG. 1 is a functional block diagram illustrating an example architecture of a navigation system in accordance with one embodiment of the invention.

FIG. 1 is a block diagram illustrating an example implementation of a combined image capture device and navigation system in accordance with one embodiment of the invention. The embodiment illustrated in FIG. 1 includes an image capture device 100 that is configured to be removably mounted to a docking station 200. The image capture device 100 includes a display screen 122, an image buffer 120; a memory card 116, imaging optics 108, image control logic 106, and navigation control logic 104. In embodiments where the navigation system utilizes GPS signals or other wireless signals to facilitate navigation operations, an antenna 112 can also be included as illustrated in FIG. 1.

In accordance with the illustrated example embodiment, the navigation control logic 104 provides the functionality used to implement the features and operation of the navigation system that is integrated with the image capture device 100. Thus, navigation control logic 104 can be used to perform functions such as route determination, real-time or near real-time position tracking, estimated time of arrival calculations, point of interest location, and a variety of other features and functions useful or desirable for performing navigation operations. As part of its operation, navigation control logic 104 can create and determine navigational information for display on display screen 122. For example, navigational information can be used to choose an appropriate map to display, determine proper centering for the map to be displayed, facilitate interactive map operations, overlay real time or near real time position information, display and update point of interest information, and otherwise facilitate other navigation features and operations.

Image control logic 106 provides functionality that can be used to capture and process digital images received by optics 108. Image control logic 106 can be implemented, for example, utilizing control logic found in digital cameras and digital video recorders whether now existing or later developed. As used in this document, the term "control logic" can be used to refer to hardware, software, or a combination thereof configured to perform the described functions.

Optics 108 can include optical components used to facilitate the capturing of images by the digital camera or other image capture device. For example, optics 108 can include components such as an objective lens, a shutter and other elements used to provide an image to a CCD or other image capture medium (not illustrated).

In the embodiment illustrated in FIG. 1, the functions performed by navigation control logic 104 are combined with those functions performed by image control logic 106 into a control logic block 102. Thus, in this embodiment, one or more processors, ASICs, PLAs, and other logic devices can be used to implement the functions of image capture and processing as well as navigation in an integrated or combined fashion. Alternatively, some or all of the respective functions of navigation control logic 104 and image control logic 106 can be implemented separately using dedicated control logic.

Memory device 116 can be included to store captured images and other information or data at the image capture device 100. For example, memory device 116 can be implemented as a removable memory card such as, for example, a compact flash or other like memory card. Alternatively, memory device 116 can be implemented using a disc drive, Microdrive®, or other information storage device or other storage technology. In one embodiment, memory device 116 can be removable from image capture device 100 to facilitate the transfer of information and images to and from memory device 116. Additionally, wired or wireless interfaces can be provided to allow the transfer and images to and from image capture device 100 and memory device 116.

Also included in the example embodiment illustrated in FIG. 1 is an image buffer 120. Image buffer 120 can be included and utilized to store captured images on a temporary basis prior to processing and storage and can also be used buffer images for display on screen 122.

In one embodiment, screen 122 is implemented as an LCD display screen and can be provided in a variety of sizes and aspect ratios. Screen 122 can be used to display captured images, to replay captured images, and to display maps and other navigational elements used by the navigation system. Although not illustrated in FIG. 1, image capture device 100 can also include its own power supply such as, for example, rechargeable batteries.

Thus, image capture device 100 can be used on a portable device to capture images (for example, take digital photographs or videos) and to provide navigation functions to the user. Thus, screen 122 can be used to display captured images, to replay captured images, and to display maps and other navigational elements used by the navigation system. As such, in this embodiment, image capture device 100 can be implemented as a standalone, combination digital camera and navigation system. Several advantages can be gained by this combination in a portable device. For example, hikers, tourists, bikers, skiers, mountain climbers, and other outdoors persons can park their vehicles, remove their camera/navigation device and embark on journeys into known or unknown territories carrying along their image capture device with the navigation system to facilitate their travels through these territories. The device can allow them to take still pictures and digital videos as well as assist them in navigating from one location to another during their outdoor adventure.

As another example, tourists in a new city may leave their vehicle behind and explore the city with the combination digital camera/navigation system in capturing the sights and sounds of the city and enjoying the features the functionality that a navigation system affords in new or different environments. Thus, for example, with a full-featured navigation system, these tourists could use the image capture device to navigate through the city, find landmarks or other tourist spots in the city, find restaurants, hotels, shops, or other destinations or points of interest within the city.

Also illustrated in FIG. 1, is docking station 200 that can be used to facilitate the operation of image capture device 100 in a number of ways. For example, in one embodiment, image capture device 100 can be physically connectable to docking station 200, with or without a latching mechanism, allowing docking station 200 to become a mounting device for image capture device 100. Thus, docking station 200 can be mounted in a vehicle to allow the invention to be utilized in conjunction with the operation of the vehicle such as, for example, a car, truck, boat, airplane, motorcycle or other vehicle. In one configuration, docking station 200 can be configured so as to be stably mounted in the vehicle. Further, as stated above, image capture device 100 can be configured to be removably mounted to docking station 200, thereby allowing a stable platform on which to mount the navigation system for navigating while traveling in the vehicle.

A communication link 114 can provide for the transfer of information between image capture device 100 and docking station 200. Communication link 114 can be wired or wireless. Also included can be a power connection to enable the transfer of the appropriate power to facilitate the operation of image capture device 100 and the charging of its batteries or other portable power supply.

In the embodiment illustrated in FIG. 1, docking station 200 includes a local data store 202, control logic 222 and a power source 212. Local data store 202 can be used to provide additional data storage to complement that which may be provided by image capture device 100. For example, data store 202 can be used to store a large database of navigational maps and other navigation information and can additionally provide supplemental storage of captured images or videos downloaded from the image capture device 100. Because the docking station 200 does not need to be carried with its users on a portable basis, docking station 200 may not have similar size and weight constraints as image capture device 100. As such, the invention in one embodiment can be implemented such that the storage device 202 is larger than that which may otherwise be practical or desirable in a portable device. Likewise, because docking station 200 can be connected to vehicle power 308, docking station can include additional features and functionality that may be impractical to incorporate into a portable device.

Power supply 212 can be included to provide any voltage or current adjustments or other power conditioning that may be useful for powering the components of docking station 200 as well as powering and charging image capture device 100. For example, docking station 200 can be configured with a cable to be plugged into a cigarette lighter outlet, an AC outlet, or any of a number of other different power sources.

Control logic 222 can be included with docking station 200 to facilitate the transfer of images between docking station 200 and image capture device 100 and to provide the control of power or charging operations for the image capture device 100. For example, in one embodiment, it may be advantageous to minimize the amount of map data that is stored locally on image capture device 100. Minimizing the amount of stored map data can reduce the memory requirements for the image capture device 100 and provide a greater amount of memory available for capturing images and digital videos by the image capture device 100. Thus, in one embodiment, control logic 222 can be implemented to manage the flow of map images, point-of-interest information, and other navigation elements and data between docking station and image capture device 100 so as to allow an efficient use of memory device 116 and image buffer 120 while still affording the user a reasonable array of navigation functions. To illustrate this feature, consider the following example. In this example, the user has the image capture device 100 mounted to docking, station 200 in the user's vehicle. As the user travels in his or her vehicle, the map data is transferred from memory 202 through interface 114 and displayed on, screen 122. Navigation control logic 104 receives, the navigation signals via antenna 112, computes the current vehicle position, and displays the current position on the map on screen 122. Thus, the user utilizes image capture device 100 to navigate to a given destination.

Continuing with this example, once at the destination, the user can un-dock the image capture device 100 from docking station 200. Because in this example control logic 222 is controlling or managing the information provided to image capture device 100, the user is left with a subset of the navigational information (maps, points-of-interest, and other navigation data) stored locally in image capture device 100. Thus, for example, the user may have one or two maps of the surrounding area and point-of-interest information for the area encompassed by those maps. Thus, the user can leave the vehicle and the remaining information behind and utilize the downloaded information for portable navigation mode.

In one embodiment, the amount of information that can be downloaded and stored locally can be configured so as to be user-selectable such that the user can identify the amount and types of information that he or she wishes to maintain on image capture device 100. Thus, for example, if the user knows that he or she will not be walking very far at a given destination and wants to reserve a maximum amount of memory for image capture, that user may specify that a small map (for example, one or two square miles) and minimal point-of-interest data is downloaded to image capture device 100. Alternatively, the user may be leaving one vehicle and entering another and may need to have a greater area encompassed by the available maps and may also desire a full complement of point-of-interest information. As such, a user-configurable system will allow the user to specify the information downloaded based on anticipated circumstances or other criteria.

Also illustrated in FIG. 1 is a data storage device 312 associated with the vehicle in which docking station 200 is located. For example, data store 312 can be a DVD-based navigation storage device that provides map and other information to the image capture device 100. Although not illustrated, other communication ports, whether wired or wireless, can be provided with image capture device 100 and docking station 200 to facilitate the transfer of information into or out of those devices. For example, a Bluetooth®, 802.11, USB, or other connection can be provided to allow image capture device 100 and docking station 200 to interface to a computer or other device or to a network to facilitate the transfer of information. Thus, that is one example, updated navigation and other information can be downloaded to the device to facilitate enhanced navigation functions.

Although the embodiment illustrated in FIG. 1 depicts an implementation wherein position determination is made by, navigation control logic 104 within image capture device 100, a more simple approach can be provided wherein image capture device 100 does not include the position determination functionality. This embodiment is illustrated by way of example in FIG. 2. In contrast to FIG. 1, the example image capture device 100 illustrated in FIG. 2 does not include navigation control logic 104 or antenna 112. However, this exemplary image capture device 100 still includes the functionality to capture and store images and the functionality to display maps and other data on screen 122. Thus, a navigation map as well as point-of-interest and other information can be downloaded to or otherwise provided to image capture device 100 and displayed on screen 122 as a user transports image capture device 100 from one location to another. This may serve to simplify and reduce the cost of image capture device 100 while still providing some level of navigational assistance. Thus, in this embodiment, a user may still be able to access and view the maps and other information on screen 122 but will not have the real-time position determination overlaid onto the map as with the embodiment illustrated in FIG. 1.

In either embodiment, the map information can be displayed in an interactive manner allowing the user to zoom in and out of the map at various levels and allowing the user to scroll in various directions along the map to facilitate navigation. Additionally, the user can select point-of-interest and other information to be accessed and displayed on the maps, again, to facilitate the navigation experience.

Figure 2:
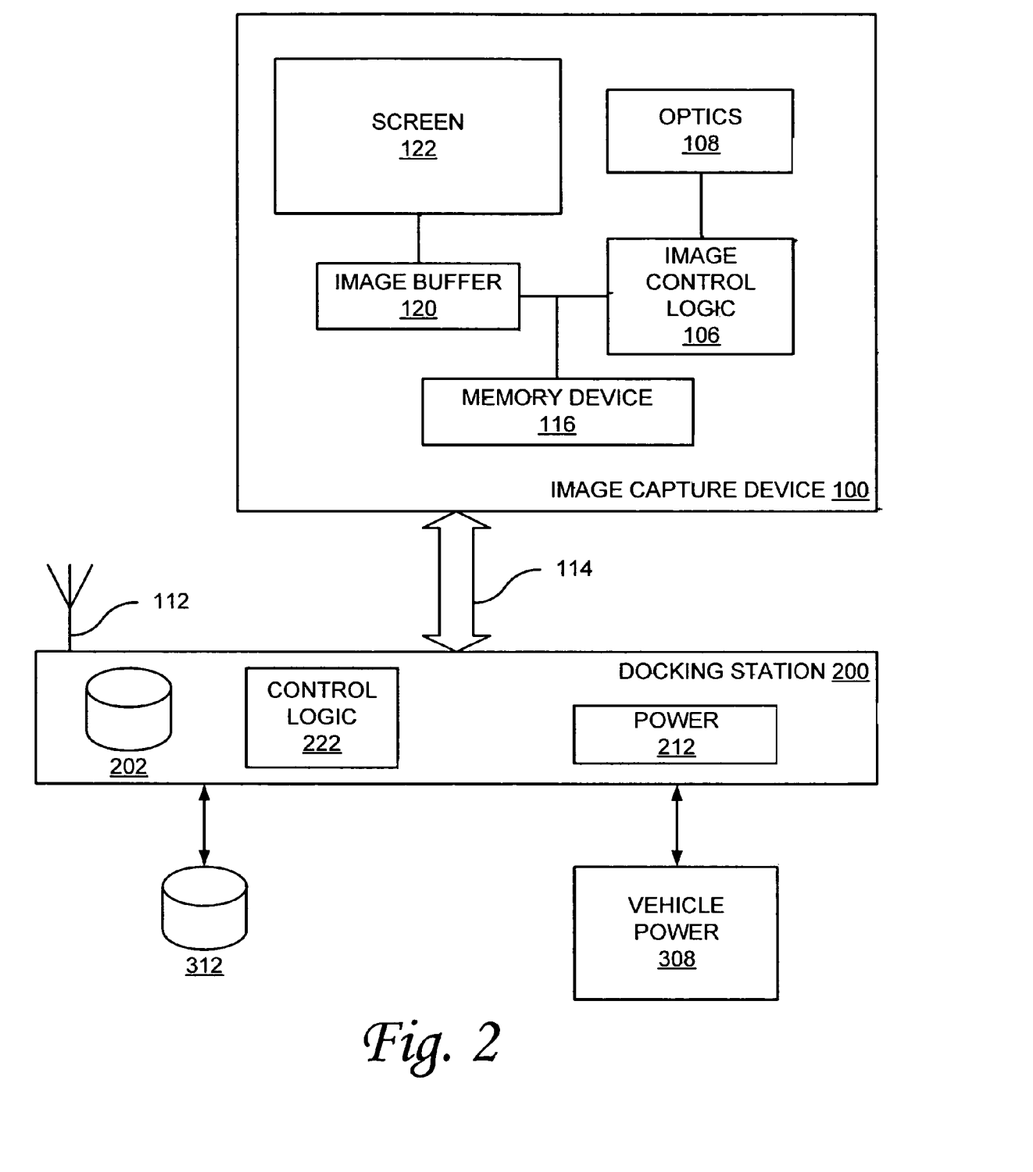
FIG. 2 is a functional block diagram illustrating an example architecture of a navigation system in accordance with another embodiment of the invention.

In the example embodiment illustrated in FIG. 2, the image capture device 100 can also be mated to a docking station 200 similar to the docking station 200 described above with reference to FIG. 1. However, to facilitate position determination in this embodiment, docking station 200 includes navigation control logic 204 to perform the position determination based on signals received from antenna 112. Thus, when image capture device 100 is docked or connected to docking station 200, image capture device 100 can facilitate real-time or near real-time navigation with position determination using the functions performed by navigation control logic 204.

It is now useful to consider an example application of the embodiment illustrated in FIG. 2. In this example, the user has docking station 200 mounted in his or her vehicle and docks the image capture device 100 to docking station 200 during his or her travels within the vehicle. During these travels, docking station 200 performs the navigation functions including real-time position determination and provides navigation information to image capture device 100 such that the navigation information can be displayed on screen 122. Thus, this combination can provide full real-time navigation features to the user traveling in his or her vehicle. When the user arrives at a destination and wishes to exit the vehicle, the user can undock image capture device 100 and carry it with him or her during his or her travels outside the vehicle. This system can utilize the latest information stored locally to image capture device 100 to facilitate navigation outside of the vehicle. This can include map images, point of interest icons, and other downloaded navigational elements. Thus, a user can go on a hike or otherwise move away from the vehicle using the latest information that was displayed on display screen 122. While the illustrated embodiment does not provide for real-time position determination, the user can still take advantage of the portable interactive map provided on the image capture device 100.

Figure 3:
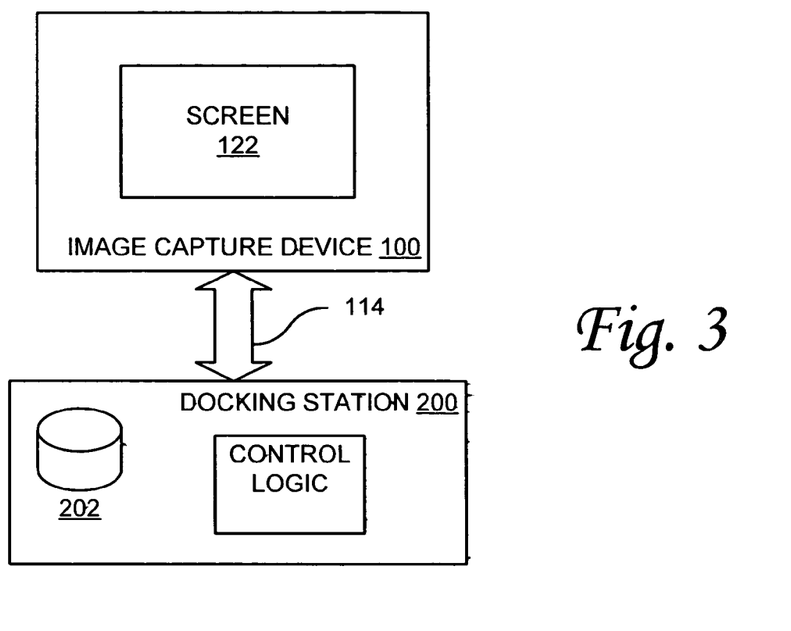
FIG. 3 is a functional block diagram illustrating an example architecture of a navigation system in accordance with yet another embodiment of the invention.
Figure 4:
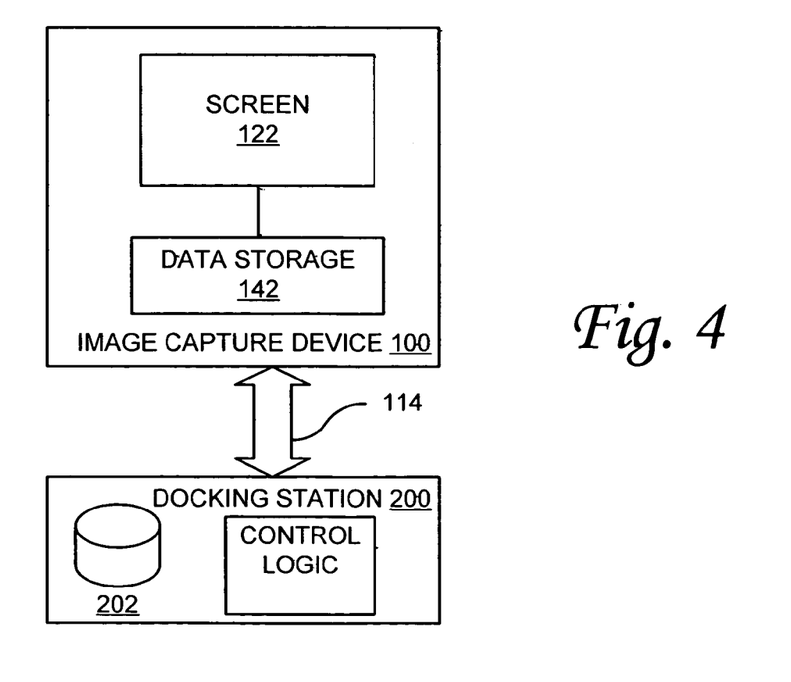
FIG. 4 is a functional block diagram illustrating an example architecture of a navigation system in accordance with still another embodiment of the invention.

In yet another embodiment, image capture device 100 can be provided without data storage for the navigation information. An example implementation of this embodiment is described with reference to FIG. 3. In this embodiment, control logic 222 or control logic in image capture device 100 can be used to determine when an undocking event is to occur and the latest map information should be downloaded to image capture device 100. Thus, a button or other user interface mechanism can be provided to allow the user to indicate that the current map data or other navigation information should be downloaded to image capture device 100. Additionally, automated techniques can be used to provide this indication such as, for example, control logic detecting a vehicle power-down situation through the docking station 200. Thus, in this example, when the user shuts off his or her vehicle, the control logic 222 detects the power-down occurrence and automatically transfers the most recent navigation information to image capture device 100. Alternatively, some amount of memory or data storage 142 can be included with image capture device 100 as illustrated in the exemplary embodiment depicted in FIG. 4. This data storage 142 can be image buffer 120, memory device 116 or some other memory or data storage instrumentality. In this embodiment, the most recently stored information can be retained for use after an un-docking event has occurred.

Figure 5:
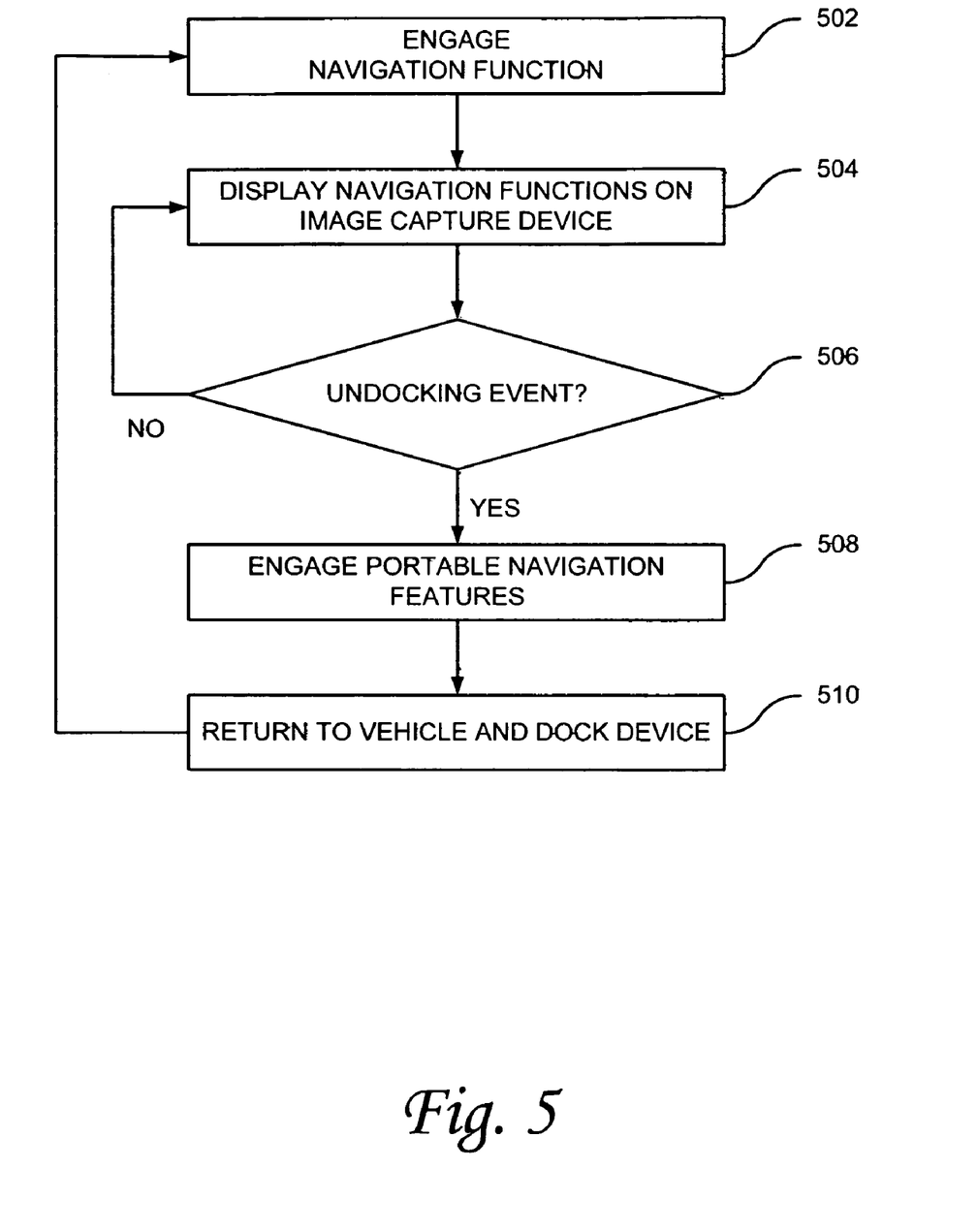
FIG. 5 is an operational flow diagram illustrating an exemplary operation of the navigation system in accordance with one embodiment of the invention.

Having thus described a few example embodiments and architectural configurations for the present invention, it is now useful to discuss its operation in terms of an exemplary operational flow diagram as illustrated in FIG. 5. Referring now to FIG. 5, in a step 502, the navigation functions of a docked image capture device 100 are enabled. Thus, an image capture device physically or electronically connected to the docking station performs the navigation functions as described above.

In a step 504, the navigation information is displayed on the display screen of image capture device 222. Preferably, image capture device 100 is mounted in such a way that it is easily viewed by and accessible by the driver of the vehicle. Additionally, interfaces can be provided to display the navigational features on a display screen separate from image capture device 100 such as, for example, a display screen that may be provided on a docking station 200 or a display screen that may be provided with the vehicle in which the system is being utilized. Voice, keypad or other data/command entry mechanisms can be provided to facilitate user interface. These can be provided on image capture device 100 and docking station 200. In one embodiment, control buttons and mechanisms used to operate the camera functions of image capture device 100 can also be used to operate the navigational functions as well.

In a step 506, an undocking event is detected by control logic. The undocking event may be triggered by removal of the image capture device from the docking station, by user input, by detection of vehicle power-down, or through other means. With the image capture device undocked, in a step 508, portable navigation features can be utilized. Thus, as discussed in the various embodiments and example scenarios described above, the user can take advantage of navigation features included with the image capture device while away from his or her vehicle.

As illustrated by the exemplary embodiments outlined above, the suite of navigation functions provided with portable operation can vary depending on the capabilities. and functionality included with the image capture device. As also discussed above, the undocking event can be an event that triggers the transfer of information between the image capture device and the docking station to better facilitate the desired level of portable navigation. In a step 510, when the user returns to his or her vehicle, the image capture device can be re-docked and the navigation functions again engaged in a docked configuration. In this document, a docking event can refer to a communicative coupling between the devices, whether wired or wireless, such that data and information can be transferred. Docking can also refer to a physical coupling wherein image capture device 100 is physically mated to docking station 200.

The present invention can be utilized with digital cameras, digital video cameras, or other image capture technology whether currently available or developed sometime later in the future. The position determination features can be implemented utilizing GPS position determination or other techniques whether currently available or developed sometime later in the future. As described above, control logic can be implemented utilizing hardware, software of a combination thereof. In one embodiment, by way of example, control logic can be implemented utilizing one or more processors and associated componentry executing a program of software instructions configured to cause the processor to perform the desired functions. As will be apparent to one of ordinary skill in the art after reading this description, other configurations for control logic can be provided including, for example, ASICs PLAs, other logic elements, discrete components, controllers, special or general purpose processors, and other configurations. As alluded to above, separate or dedicated elements of control logic can be provided to perform the various functions of the image capture device including those of image capture and of navigation. Additionally, any or all of these functions can be integrated into a single grouping of control logic or distributed among several groupings of control logic.

While various embodiments of the present invention have been described above, it should be understood that they have been presented by way of example only, and not of limitation. Thus the breadth and scope of the present invention should not be limited by any of the above-described exemplary embodiments, but should be defined only in accordance with the following claims and their equivalents. Additionally, the invention is described above in terms of various exemplary environments, embodiments and implementations. It should be understood that the various features and functionality described in one or more of the individual embodiments, environments or implementations are not limited in their applicability to the particular environment, embodiment or implementation with which they are described, but instead can be applied, alone or in some combination, to one or more alternative environments, embodiments or implementations of the invention, whether or not such environments, embodiments or implementations are described and whether or not such features are presented as being a part of a described environment, embodiment or implementation.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives like "conventional," "traditional," "normal," "standard," and terms of similar meaning should not be construed as limiting the item described to a given time period or to an item available as of a given time, but instead should be read to encompass conventional, traditional, normal, or standard technologies that may be available now or at any time in the future. A group of items linked with the conjunction "and" should not be read as requiring that each and every one of those items be present in the grouping, but rather should be read as "and/or" unless expressly stated otherwise. Likewise, a group of items linked with "or" should not be read as requiring mutual exclusivity among the items in the group, but rather should be read as "and/or" unless expressly stated otherwise.

What is claimed is:

1. A digital camera system, comprising:
    optical elements configured to focus an image onto a focal plane;
    an image capture medium positioned at the focal plane configured to capture the image focused onto the focal plane;
    image control logic configured to process images captured by the image capture medium;
    navigation control logic configured to perform navigation functions and to determine navigational information;
    a display screen communicatively coupled to the image control logic and the navigation control logic and configured to display at least one of an image captured by the image capture medium and a map for navigation purposes;
    a docking station configured to be communicatively coupled to the digital camera and comprising an information storage device; and
    control logic configured to detect an undocking event and to transfer navigational information from the docking station to the image capture device in advance of the undocking event.

2. The digital camera system of claim 1, wherein the navigation functions comprise at least one of route determination, real-time position tracking, near real-time position tracking, estimated time of arrival calculations and point of interest location.

3. The digital camera system of claim 1, wherein at least a portion of the navigation control logic is located in the docking station and communicatively coupled to the digital camera.

4. The digital camera system of claim 1, wherein the navigation control logic is located in the digital camera.

* * * * *